United States Patent [19]

Kifferstein

[11] 4,206,945
[45] Jun. 10, 1980

[54] BACK AND HEAD SHEET

[76] Inventor: Harry P. Kifferstein, 27250 Harvard Rd., Southfield, Mich. 48076

[21] Appl. No.: 947,500

[22] Filed: Oct. 2, 1978

[51] Int. Cl.² .................... A61G 15/00; A47C 1/10
[52] U.S. Cl. ............................... 297/220; 5/434; 297/DIG. 6; 297/397
[58] Field of Search ............... 297/DIG. 6, 220, 221, 297/222, 406, 391, 397; 5/340, 339, 341, 355, 337, 327 R, 434; D6/201; 24/204

[56] References Cited

U.S. PATENT DOCUMENTS

| D. 176,758 | 1/1956 | Edmonson | D6/201 |
|---|---|---|---|
| 2,462,780 | 2/1949 | Schiller | 5/339 X |
| 3,266,841 | 8/1966 | Altman | 297/220 |
| 3,279,849 | 10/1966 | Radke et al. | 297/DIG. 6 |
| 3,292,973 | 12/1966 | Cogut | 297/397 |
| 3,578,383 | 5/1971 | Earl | 297/391 |
| 3,608,964 | 9/1971 | Earl | 297/397 |
| 3,654,059 | 4/1972 | Zisblatt | 297/220 |
| 4,042,278 | 8/1977 | Jensen | 297/397 |
| 4,056,281 | 11/1977 | Byrnes | 24/204 |
| 4,097,086 | 6/1978 | Hudson | 5/434 X |

FOREIGN PATENT DOCUMENTS 2150042  4/1973  Fed. Rep. of Germany ........... 297/220

Primary Examiner—James T. McCall
Attorney, Agent, or Firm—Hauke and Patalidis

[57] ABSTRACT

A removable and disposable back and head cloth or sheet attachable by an edge to the top of a chair or seat back and draping over the front of the seat back for engagement with the back of the head of a person sitting in the chair or seat. The head and back sheet of the invention may be used singly or in combination with an additional back and head sheet of a conventional design, and is arranged for use in combination with removable disposable headrests which are attached to the head and back sheet by means of adhesive or by being placed in a pocket provided in or formed by the head and back sheet of the invention.

14 Claims, 36 Drawing Figures

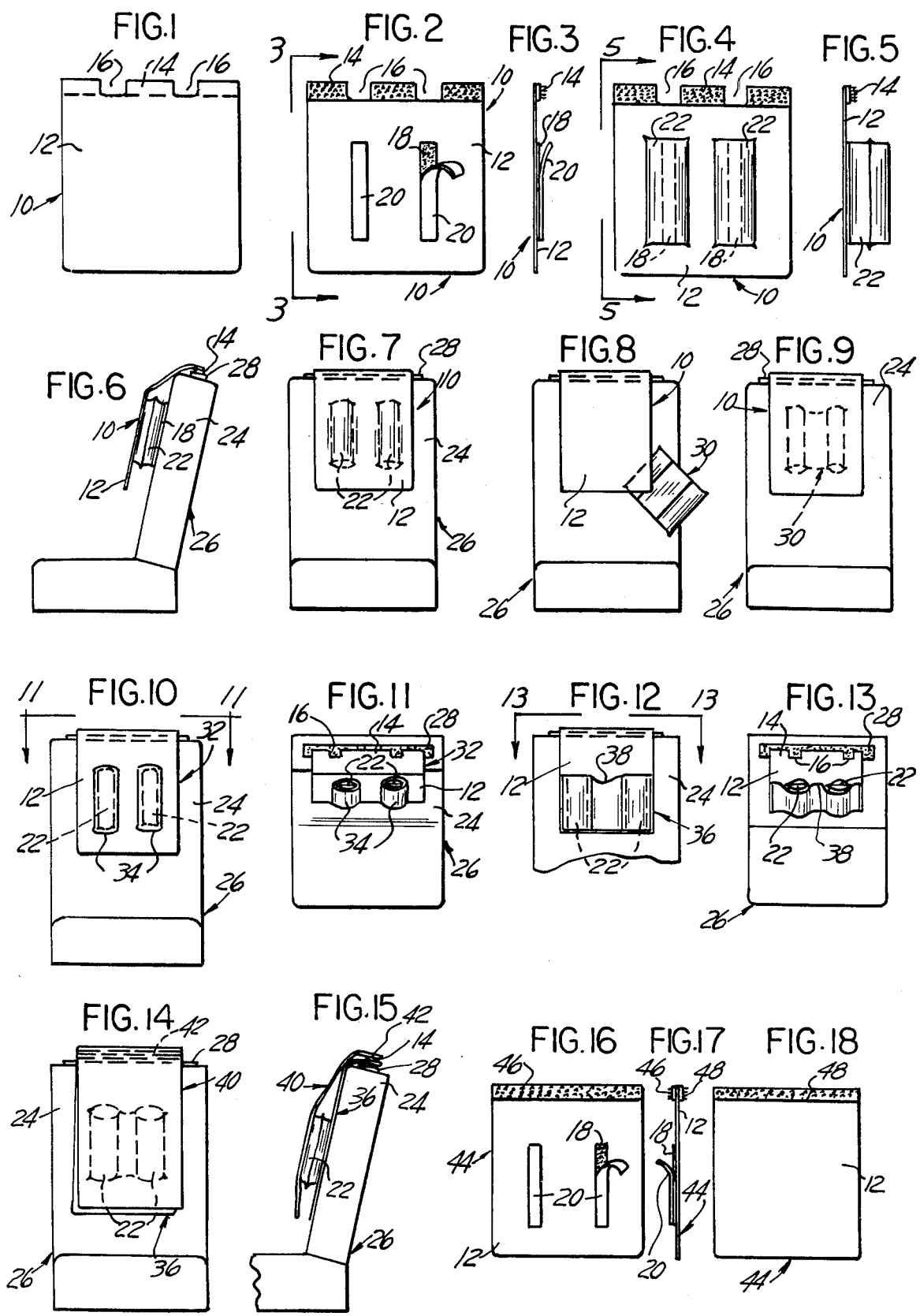

U.S. Patent Jun. 10, 1980 Sheet 2 of 2 4,206,945
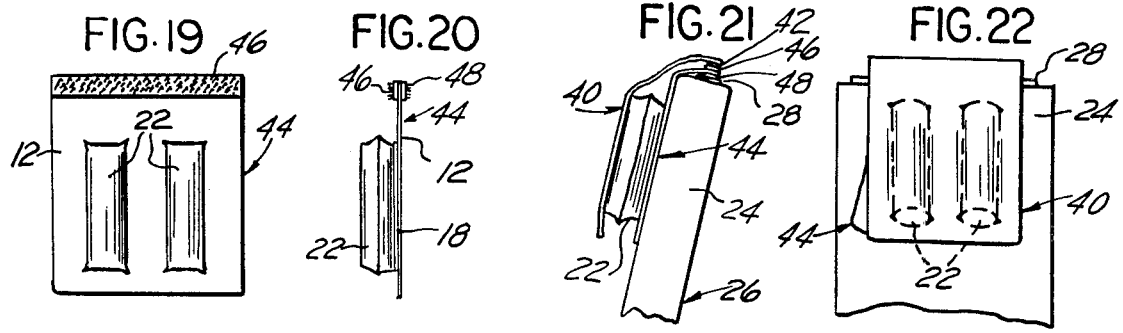
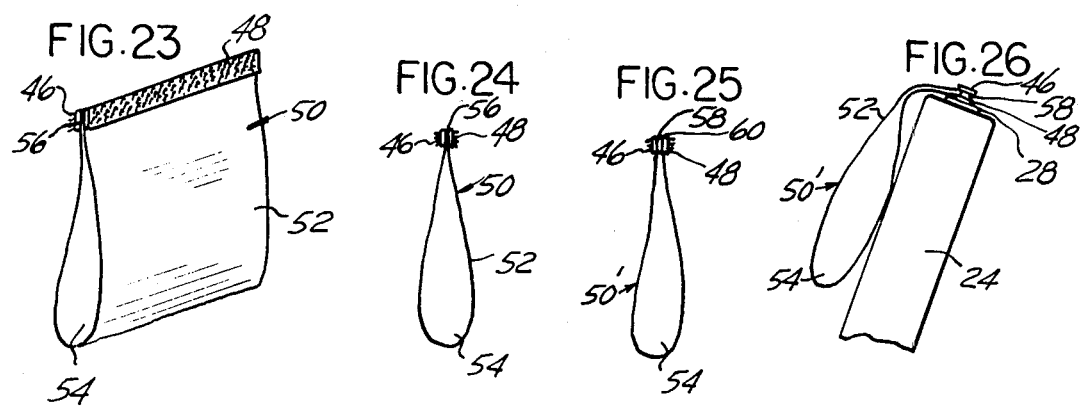
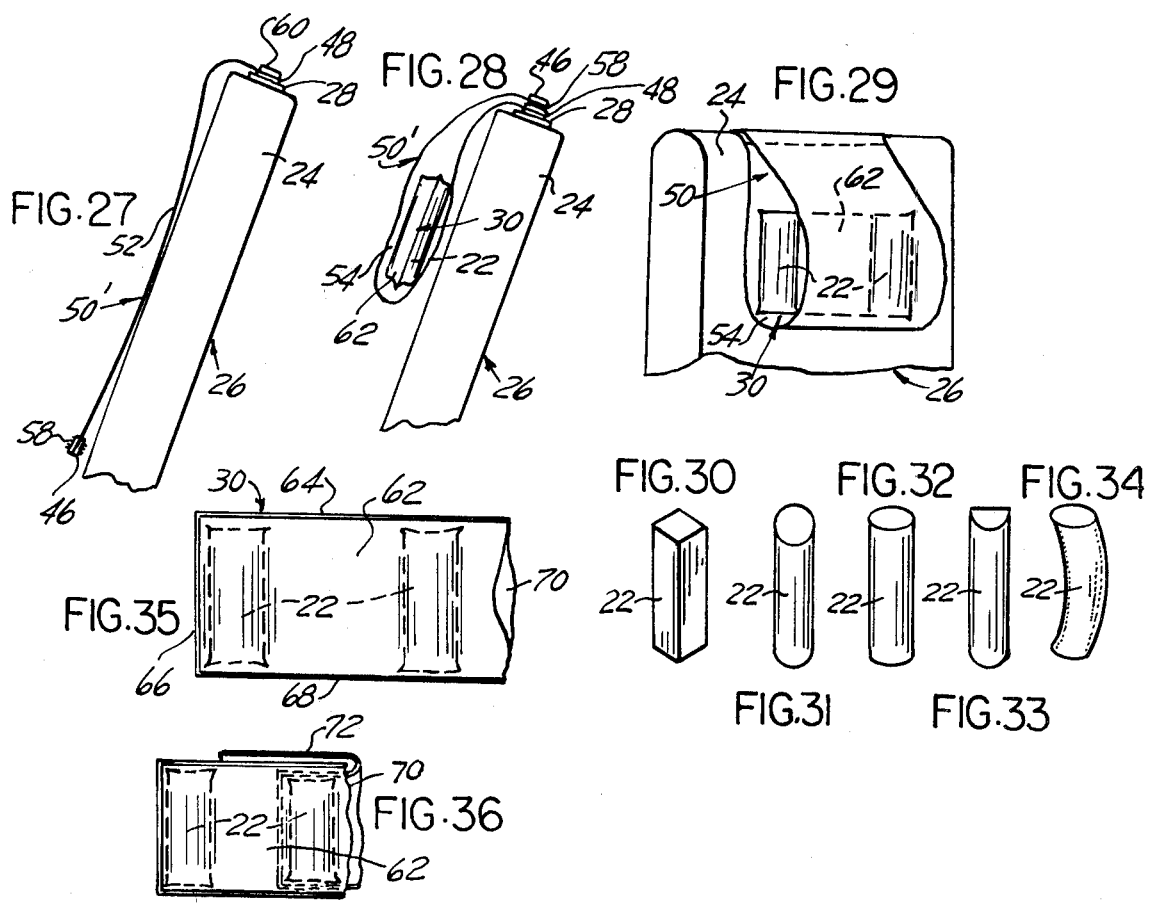

BACK AND HEAD SHEET

BACKGROUND OF THE INVENTION

The present invention relates to head and back sheet for draping over the front of a seat back, and more particularly for use as a cover for the seat backs of mass transportation vehicles, such as railroad cars, buses, airplanes, or passenger cars.

It is common practice to attach to the top of the back of the seat of a mass transportation vehicle a sanitary head sheet draped over the front of the seat back and forming a disposable clean and sanitary surface engaged by the back of the head of a passenger sitting in the seat. Such head sheets are sometimes made of linen or fabric which are removed and laundered after each use, and which are reused after being laundered and sanitized. More often, however, the head sheets are made of relatively inexpensive linen or fabric-like paper material, and they are disposed of after each use.

Many arrangements have been provided for attaching a head sheet to a seat back, such as ordinary pins, safety pins, snaps, clips or the like. More conveniently, and more particularly on airplanes, the top of the seat back is provided with a band or strip of the hook-type pile or interlocking fabric generally sold under the tranemark "Velcro," and the head sheet is provided at an edge with a strip of loop-type low-cost Velcro material for removable attachment to the seat band of Velcro material.

On some mass transportation vehicles, more particularly on airplanes, cushions are also made available to the passengers. The cushions are conventional in shape, are of relatively small size and are provided with a removable disposable case.

Most passengers are inclined to relax and sleep, more particularly on airplanes where space is somewhat cramped, reclining adjustment of the seat back is rather limited, and walking through the aisles is generally discouraged. However, it is sometimes difficult for most passengers to be able to assume a relaxed and comfortable position in a rather confined space in a relatively narrow seat, and unless the passenger is able to assume a position permitting him to support the side of his head back against a cushion, his head, when asleep or dozing, tends to wobble from side to side, which leads to irritating successive periods of rest and full awakeness. It is readily apparent that seats could be provided with a back having an appropriate recess for the back of the head or with built-in headrests. However, seats with built-in headrests are expensive and are not generally provided on mass transportation vehicles and, even if provided, they would still present some inconveniences as the position of the headrest is fixed.

In a co-pending application, Ser. No. 947,501 there is described a variety of disposable adjustable headrests, convertible to pillows or cushions, which may be used as such or in combination with conventional head sheets and preferably in combination with the head sheets of the invention permitting to readily attach thereto such adjustable disposable headrests.

SUMMARY OF THE INVENTION

The present invention provides an improved head and back sheet which, if so desired, can be used in a conventional manner or, alternatively, which may be used with adjustable disposable headrests, or which is provided with means for attaching to the head and back sheet a disposable adjustable headrest.

The present invention accomplishes its purpose by providing a head and back sheet which is removably attachable to the front of a seat back, which can be used, if so desired, in combination with a conventional head sheet, and which has a structure permitting to attach thereto a disposable adjustable headrest.

The diverse objects and advantages of the present invention will become apparent to those skilled in the art when the following description of examples of the best modes contemplated for practicing the invention is read in conjunction with the accompanying drawing, wherein like numerals refer to like or equivalent parts, and in which:

BRIEF DESCRIPTION OF THE DRAWING

FIG. 1 is a front plan view of an example of head and back sheet according to the present invention;

FIG. 2 is a rear plan view thereof;

FIG. 3 is a side view thereof from line 3—3 of FIG. 2;

FIG. 4 is a view similar to FIG. 2 but showing the head and back sheet of the invention provided with removable headrest pillow units;

FIG. 5 is a side view thereof from line 5—5 of FIG. 4;

FIG. 6 is a side view of the head and back sheet and headrest combination of FIG. 4 attached over the back of a seat;

FIG. 7 is a front elevational view thereof;

FIGS. 8–9 are views similar to FIG. 7 but showing a modification thereof;

FIGS. 10 and 11 are respectively a front elevational view and a top view of a combination head and back sheet and headrest according to the present invention;

FIGS. 12 and 13 are respectively a front elevation and a top view of a modification thereof;

FIGS. 14 and 15 are respectively a front and a side view of a head and back sheet and headrest combination according to the present invention in use with a conventional head sheet;

FIGS. 16, 17 and 18 are respectively a rear elevation view, a front elevation view, and a side view of another example of a head and back sheet according to the present invention;

FIGS. 19 and 20 are respectively a rear view and a side view of the head and back sheet of FIGS. 16-18 provided with removable headrest cushion elements;

FIGS. 21 and 22 are respectively a side elevation and a front elevation of the head and back sheet and headrest combination of FIGS. 19-20 shown mounted over the front of a seat back;

FIG. 23 is a perspective view of another example of head and back sheet according to the present invention;

FIG. 24 is a side view thereof;

FIG. 25 is a view similar to FIG. 24 but showing a modification thereof;

FIG. 26 is a side view of the head and back sheet of FIG. 25 shown mounted such as to drape over the front of a seat back;

FIG. 27 is a view similar to FIG. 26 and showing an alternative use of the head and back sheet of FIGS. 25-26;

FIG. 28 is a side view of the head and back sheet of FIGS. 25 and 26 shown in use for supporting a removable disposable headrest;

FIG. 29 is a perspective view of the arrangement of FIG. 28;

FIGS. 30 through 34 are schematic perspective views of alternate configurations for headrest pillow units for use with the head and back sheet of the present invention;

FIG. 35 is a front plane view of a removable disposable headrest for use with the head and back sheet of the present invention; and FIG. 36 is a perspective view similar to FIG. 35 but showing an alternate structure.

DETAILED DESCRIPTION OF THE PREFERRED EMBODIMENTS

Referring now to the drawing and more particularly to FIGS. 1–3 thereof, there is illustrated a head and back sheet 10, according to the present invention, made of a single sheet 12 of linen or fabric, or, preferably, of a relatively low-cost soft non-woven paper sheet material, or a combination of woven paper and plastic material, such as the material used for making the removable disposable head sheets for mass tranportation vehicle seats. The sheet 12 of material forming the head sheet 10 is of generally square or rectangular shape, and is provided at an edge with a strip 14 of loop-type Velcro material for attachment to a complementary band of hook-type Velcro material permanently attached to the top of a seat back. The edge of the sheet 12 provided with the strip 14 of Velcro material has, for example, a couple of cut-out portions 16 which enables to expose sections of the strip of Velcro material permanently attached to the top of the seat back, such that a second sheet of material, such as a conventional head sheet for example, can be attached to the exposed portion of the hook-type Velcro material permanently attached to the seat back. The back of the sheet 12 has a pair of generally parallely disposed strips of adhesive 18 each provided preferably with a band of release paper 20. By peeling off the bands of release paper 20, the two strips of adhesive material 18 are exposed and to each one may be attached an elongated headrest pillow unit 22, as shown at FIGS. 4–5.

It is readily apparent that the head and back sheet 10 of FIGS. 1–2 may be used as any conventional head sheet, or it may be used with the headrest-forming pillow units 22 attached to the back thereof, if desired. It will also be appreciated that means other than the adhesive 18 may be used for attaching the headrest pillow units 22, such as providing, for example, the back of the sheet 12 with strips of Velcro material and providing a side surface of the headrest pillow units 22 with a complementary strip of Velcro material.

The headrest pillow units 22 may be made in any convenient manner. They may consist of a fabric or paper material case filled with a resilient elastomeric material such as shredded paper, feathers, down and the like, or they may be molded of a single piece of generally cylindrical shape made of a soft resilient elastomeric material, such as a foamed resilient plastic or the like. FIGS. 30–34 illustrate diverse convenient shapes for the headrest pillow units 22, such as the parallelepipedonal shape of FIG. 30, the circularly cylindrical shape of FIG. 31, the cylindrical shape of FIG. 32 having an oval cross-section or the half-circular or half-oval cylindrical shape of FIG. 33. The headrest pillow units 22 may be straight, or they may have any shape as is convenient, such as the crescent shape of FIG. 34.

Referring now to FIGS. 6–7, an example of use of the headrest-provided head and back sheet 10 of FIGS. 4–5 is illustrated, which consists in attaching the sheet 12 to the back 24 of a seat 26. The top of the seat back 24 is provided with a strip 28 of preferably hook-type Velcro material permanently attached thereto. The strip 14 of loop-type Velcro material at the edge of the sheet 12 is attached to the complementary strip 28 of Velcro material permanently attached to the top of the seat back 24 and the sheet 12 is draped over the front of the seat back 24, with the headrest pillow units 22 disposed between the surface of the upholstery on the front of the seat back 24 and the back surface of the sheet 12 to which they are adhesively attached. A person sitting on the seat 26 is thus enabled to apply the back of his head to the portion of the sheet 12 between the two spaced-apart substantially parallel headrest pillow units 22, the sheet 12 being depressed between the pillow units 22 and following the contour of the back of the person's head, and the two headrest pillow units 22 providing an adequate soft resilient support for both sides of the person's head back.

FIGS. 8–9 schematically illustrate how the head and back sheet 10 of the invention may be used in combination with a preformed single unit headrest 30, described in full detail hereinafter, and disclosed in diverse embodiments in the aforesaid co-pending application. The headrest unit 30 is slipped under the sheet 12, and is conveniently held by the adhesive strips on the back of the sheet 12 or, alternatively, is frictionally held between the back surface of the sheet 12 and the surface of the seat back upholstery, thus permitting the user to position the headrest unit 30 at any convenient position behind the sheet 12.

FIGS. 10–11 illustrate a modified head and back sheet 32 consisting of a sheet 12 of soft pliable material having a pair of spaced-apart pockets 34, in each of which is removably placed a resilient headrest pillow unit 22, thus forming a built-in headrest. FIGS. 12–13 illustrate a modification wherein the sheet 12 of the head and back sheet 36 is provided with a single pocket 38 extending from side to side in which is disposed a pair of spaced-apart elongated headrest pillow units 22. In the arrangement of FIGS. 12–13, the position and separation of the pillow units 22 in the pocket 38 may be manually adjusted, or the separate pillow units 22 may be replaced by a single headrest unit similar to the headrest unit 30 of FIGS. 8–9.

FIGS. 14–15 illustrate how a modified head and back sheet according to the present invention provided with a headrest portion, such as the head sheet 36, can be used in combination with a conventional head sheet 40. For that purpose, the head and back sheet 36 of the invention is attached by means of its Velcro material strip 14 to the Velcro material strip 28 permanently attached to the top of the seat back 24, thus leaving portions of the seat back Velcro material strip 28 exposed through the cut-out portions 16, FIGS. 1–2 and 4, of the sheet. A conventional head sheet 40, having at an edge a strip 42 of loop-type Velcro material is draped over the head and back sheet 36 and its edge provided with a strip 42 of Velcro material is attached to the strip 28 of Velcro material permanently attached to the top of the seat back 24, portion of the Velcro material strip 42 adhering through the cut-out portions 16 to the exposed portions of the strip 28 of Velcro material attached to the top of the seat back 24, FIGS. 14–15.

FIGS. 16–18 illustrate a modification of the head and back sheet of FIGS. 1–3. The head and back sheet 44 of FIGS. 16–18 also consists of a square or rectangular sheet 12 of soft pliable material provided on its front surface, as shown at FIG. 16, with two parallel strips of adhesive 18 normally protected each by a strip of peelable release paper 20. The rear surface of the sheet 12, FIG. 17, is left bare. Along the top edge of the front of the sheet 12 is fastened a strip 46 of hook-type Velcro material, while the same edge is provided at the rear face of the sheet 12 with a strip 48 of loop-type Velcro material. After removing the peelable strips 20 of release paper, a pair of elongated resilient headrest pillow units 22 may be attached to the back of the sheet 12, as illustrated at FIGS. 19–20. In use, the headrest-head sheet combination 44 is attached by means of its loop-type Velcro strip 48 to the hook-type Velcro strip 28 permanently attached to the top of the back 24 of the seat 26, thus permitting the head and back sheet 44 provided with its pair of spaced-apart headrest pillow units 22 to drape over the front of the seat back upholstery. A conventional head sheet 40, having at its edge a strip 42 of loop-type Velcro material can then be attached by pressing against the strip 46 of hook-type Velcro material at the edge of the head and back sheet 44, such that the conventional head sheet 40 covers the headrest-provided head sheet 44, FIGS. 21 and 22.

Referring now to FIGS. 23–24, there is illustrated a modified head and back sheet 50 according to another aspect of the present invention. The head and back sheet 50 is made of a length of sheet material 52 folded over so as to form a loop 54, the two terminal edges of the sheet 52 being attached, cemented, spliced or sewn together, as shown at 56. One side of the sewn edge 56 is provided with a strip 46 of loop-type Velcro material, while the other side is provided with a strip 46 of hook-type Velcro material. The strips 46 and 48 of Velcro material permit to attach the head sheet 50 to the strip of Velcro material permanently affixed to the top of a seat back, by using the strip 48 of loop-type material for that purpose, while permitting another head sheet provided with an appropriate strip of loop-type Velcro material to be pressure-attached to the strip 46. Instead of being permanently fastened together as shown at 56 at FIGS. 23 and 24, the two end edges of the sheet 52 may be removably attached to each other, as shown at FIG. 25, by being provided at their adjacent faces with complementary strips 58 and 60 of Velcro material, such that when fastened to the top of a seat back 24 in the manner shown at FIG. 26, the exterior portion of the sheet 52 may be peeled off, as shown at FIG. 27 and thus form a convenient head and back sheet 50' extending practically to the bottom of the seat back 24. Such a structures, as the head and back sheet 50' of FIGS. 25–27, is particularly useful for providing an appropriate sanitary head sheet for short people whose torso length is such that the back of their head would normally engage the uncovered seat back upholstery below a conventional head sheet of normal length and capable of accommodating only a person of normal adult size.

As shown at FIGS. 28–29, the loop-type head and back sheet 50 or 50' of the invention when attached by its top edge to the top of a seat back 24, forms a convenient holding means for either a pair of individual pillow units or preferably for a headrest 30 formed by a pair of pillow units 22 disposed spaced-apart in a common pillowcase 62, such adjustable headrest 30 being of any convenient structure as hereinafter described or as described in more detail in the co-pending application. Alternatively, if so desired, a cushion can be placed within the loop 54 of the head and back sheet 50 or 50'.

At FIG. 35, there is illustrated a structure for an adjustable disposable headrest 30 of the type that can be used with the head and back sheets of the invention. The headrest 30 is made of a pillowcase 62 closed on three sides 64, 66 and 68 and open on one side, as shown at 70. A pair of resilient elastomeric headrest pillow units 22 are placed in the pillowcase 62, one of the pillow units 22 being disposed advantageously at the fully closed end of the pillowcase 62, while the other pillow unit 22 disposed proximate the open end 70 of the pillowcase 62 can be reached and displaced to any appropriate position. It is readily apparent that the structure of FIG. 35 may be arranged to take the shape of a pillow cushion by placing the two pillow units 22 next to each other and wrapping the surplus length of the pillowcase 62 in the form of a bundle, or by wrapping the portion of the pillowcase 62 containing the left-most or right-most pillow unit 22 around the portion containing the other pillow unit.

FIG. 36 illustrates another arrangement for an adjustable headrest convertible to a pillow or cushion, consisting of a pair of pillowcases 62 and 72, each having a single open end and each provided on the inside with a pillow unit 22. The pillowcase 72 with its pillow unit 22 is pushed through the opening 70 of the pillowcase 62, and the surplus length of the pillowcase 72 projecting from the opening 70 of the pillowcase 62 may be folded in the back or in the front of the pillowcase 62. It will be appreciated that by pushing the pillowcase 72 within the pillow-case 62 such that its pillow unit 22 is placed adjacent to the pillow unit 22 disposed at the closed end of the pillowcase 62, and wrapping the surplus material of the two pillowcases 62 and 72 around in the form of a bundle, a pillow or cushion can thus be formed.

Having thus described the present invention by way of examples of structures, modification whereof will be apparent to those skilled in the art, what is claimed as new is as follows:

1. A removable disposable head and back sheet for attaching to the top of a seat back and for draping over the front of said seat back, said head and back sheet comprising a sheet of soft pliable material, means at an edge of said sheet for attaching to said seat back top, and means at said edge of said sheet enabling a second sheet to be attached to said seat back top, wherein said seat back top is provided with a strip of Velcro material permanently attached thereto and said sheet is provided at said edge with a strip of complementary Velcro material, said means enabling a second sheet to be attached to said back seat top comprising a cut-out portion at said edge of said first sheet exposing portions of said strip attached to said seat back top.

2. The head and back sheet of claim 1 further comprising means for attaching on one side of said sheet a removable headrest.

3. The head and back sheet of claim 1 wherein said means for attaching a removable headrest comprises at least one strip of adhesive.

4. The head and back sheet of claim 2 wherein said means for attaching a headrest comprises a pocket formed in said sheet accepting said headrest therein.

5. The head and back sheet of claim 2 wherein said means for attaching a headrest comprises a pair of pockets formed in said sheet each accepting an elongated resilient pillow unit.

6. A removable disposable head and back sheet for attaching to the top of a seat back and for draping over the front of said seat back, said head and back sheet comprising a sheet of soft pliable material, and means at an edge of said sheet for attaching to said seat back top, wherein said sheet is looped upon itself and the ends of said sheet are permanently attached to each other at said edge provided with means enabling said sheet to be attached to said seat back top.

7. A removable disposable head and back sheet for attaching to the top of a seat back and for draping over the front of said seat back, said head and back sheet comprising a sheet of soft pliable material, and means at an edge of said sheet for attaching to said seat back top, wherein said sheet is looped upon itself and has ends removably attached to each other at said edge provided with means enabling said sheet to be attached to said seat back top.

8. The head and back sheet of claim 6 further comprising a removable headrest disposed within said looped upon itself sheet.

9. The head and back sheet of claim 7 further comprising a removable headrest disposed within said looped upon itself sheet.

10. A removable disposable head and back sheet for attaching to the top of a seat back and for draping over the front of said seat back, said head and back sheet comprising a sheet of soft pliable material, means at an edge of said sheet for attaching to said seat back top, and means at said edge of said sheet enabling a second sheet to be attached to said seat back top, wherein said seat back top is provided with a strip of Velcro material permanently attached thereto and said sheet is provided with a strip of complementary Velcro material permanently attached at said edge on one side of said sheet, said means enabling a second sheet to be attached to said back seat top comprising a strip of Velcro material of the same type as said strip of Velcro material attached to said seat back top being permanently attached to the other side of said sheet at said edge.

11. The head and back sheet of claim 10 further comprising means for attaching on one side of said sheet a removable headrest.

12. The head and back sheet of claim 11 wherein said means for attaching a removable headrest comprises at least one strip of adhesive.

13. The head and back sheet of claim 11 wherein said means for attaching a headrest comprises a pocket formed in said sheet accepting said headrest therein.

14. The head and back sheet of claim 11 wherein said means for attaching a headrest comprises a pair of pockets formed in said sheet each accepting an elongated resilient pillow unit.

* * * * *